US010211517B2

(12) United States Patent
Yen et al.

(10) Patent No.: US 10,211,517 B2
(45) Date of Patent: Feb. 19, 2019

(54) MOBILE DEVICE

(71) Applicant: Acer Incorporated, New Taipei (TW)

(72) Inventors: Ming-Ching Yen, New Taipei (TW);
Kun-Sheng Chang, New Taipei (TW);
Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 24 days.

(21) Appl. No.: 15/464,580

(22) Filed: Mar. 21, 2017

(65) Prior Publication Data

US 2017/0358845 A1 Dec. 14, 2017

(30) Foreign Application Priority Data

Jun. 13, 2016 (TW) .............................. 105118334 A

(51) Int. Cl.
| | | |
|---|---|---|
| *H01Q 1/24* | (2006.01) | |
| *H01Q 5/20* | (2015.01) | |
| *H01Q 1/38* | (2006.01) | |
| *H01Q 1/22* | (2006.01) | |
| *H01Q 5/35* | (2015.01) | |
| *H01Q 5/40* | (2015.01) | |
| *H04W 88/02* | (2009.01) | |

(52) U.S. Cl.
CPC .......... *H01Q 1/243* (2013.01); *H01Q 1/2266* (2013.01); *H01Q 1/38* (2013.01); *H01Q 5/20* (2015.01); *H01Q 5/35* (2015.01); *H01Q 5/40* (2015.01); *H04W 88/02* (2013.01)

(58) Field of Classification Search
CPC ........ H01Q 1/243; H01Q 1/38; H01Q 9/0421; H01Q 9/30

USPC .......................... 343/702, 861, 854, 700 MS
See application file for complete search history.

(56) References Cited

U.S. PATENT DOCUMENTS

| 7,667,663 B2 | 2/2010 | Hsiao et al. | |
| 2013/0016013 A1* | 1/2013 | Wong ..................... | H01Q 1/243 343/700 MS |
| 2015/0022422 A1* | 1/2015 | Chang .................... | H01Q 1/243 343/861 |

FOREIGN PATENT DOCUMENTS

| TW | I329389 B | 8/2010 |
| TW | I508364 B | 11/2015 |

OTHER PUBLICATIONS

TW Office Action dated Jan. 19, 2018 in corresponding Taiwan application (No. 105118334).
Search Report issued in TW Office Action dated Jan. 19, 2018 in corresponding Taiwan application (No. 105118334).

* cited by examiner

*Primary Examiner* — Dameon E Levi
*Assistant Examiner* — Collin Dawkins
(74) *Attorney, Agent, or Firm* — McClure, Qualey & Rodack, LLP

(57) ABSTRACT

A mobile device includes a system ground plane and an antenna system. The antenna system includes a dielectric substrate, an antenna ground plane, a radiation element, and at least one feeding element. The antenna ground plane is coupled to the system ground plane. The feeding element is coupled to a signal source. The feeding element is positioned between the radiation element and the antenna ground plane. The feeding element and the radiation element are completely separate from each other. The radiation element is excited by the feeding element by coupling.

9 Claims, 11 Drawing Sheets

MOBILE DEVICE

CROSS REFERENCE TO RELATED APPLICATIONS

This Application claims priority of Taiwan Patent Application No. 105118334 filed on Jun. 13, 2016, the entirety of which is incorporated by reference herein.

BACKGROUND OF THE INVENTION

Field of the Invention

The disclosure generally relates to a mobile device, and more particularly, to a mobile device and an antenna system therein.

Description of the Related Art

With advancements in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

An antenna system is indispensable in a mobile device supporting wireless communication. However, since the interior space of a mobile device is very limited, multiple antennas are usually disposed close to each other, and such a design causes serious interference between antennas. The traditional solution is to increase the distance between the antennas to enhance the isolation, but this also results in the size of the whole antenna system being too large. As a result, there is a need to design a new antenna system for solving the aforementioned problem.

BRIEF SUMMARY OF THE INVENTION

In a preferred embodiment, the invention is directed to a mobile device including a system ground plane and an antenna system. The antenna system includes a dielectric substrate, an antenna ground plane, a radiation element, and a first feeding element. The antenna ground plane is coupled to the system ground plane. The first feeding element is coupled to a first signal source. The first feeding element is positioned between the radiation element and the antenna ground plane. The first feeding element is completely separate from the radiation element.

In some embodiments, the radiation element is excited by the first feeding element by coupling, so as to generate a low-frequency band and a high-frequency band.

In some embodiments, the low-frequency band is from 2400 MHz to 2500 MHz, and the high-frequency band is from 5150 MHz to 5850 MHz.

In some embodiments, the length of the radiation element is 0.5 wavelength of the low-frequency band.

In some embodiments, the length of the first feeding element is 0.25 wavelength of the high-frequency band.

In some embodiments, a first coupling gap is formed between the radiation element and the first feeding element, and the width of the first coupling gap is from 0.15 mm to 0.35 mm.

In some embodiments, the antenna system further includes a second feeding element. The second feeding element is coupled to a second signal source, and is positioned between the radiation element and the antenna ground plane. The second feeding element is completely separate from the radiation element.

In some embodiments, the radiation element is further excited by the second feeding element by coupling, so as to generate a low-frequency band and a high-frequency band. The length of the second feeding element is 0.25 wavelength of the high-frequency band.

In some embodiments, a second coupling gap is formed between the radiation element and the second feeding element, and the width of the second coupling gap is from 0.15 mm to 0.35 mm.

In some embodiments, the mobile device is a notebook computer. The notebook computer further includes an upper cover and a lower cover. A display device is embedded in the upper cover. The antenna system is disposed between the display device and an edge of the upper cover, and is adjacent to a corner of the upper cover.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
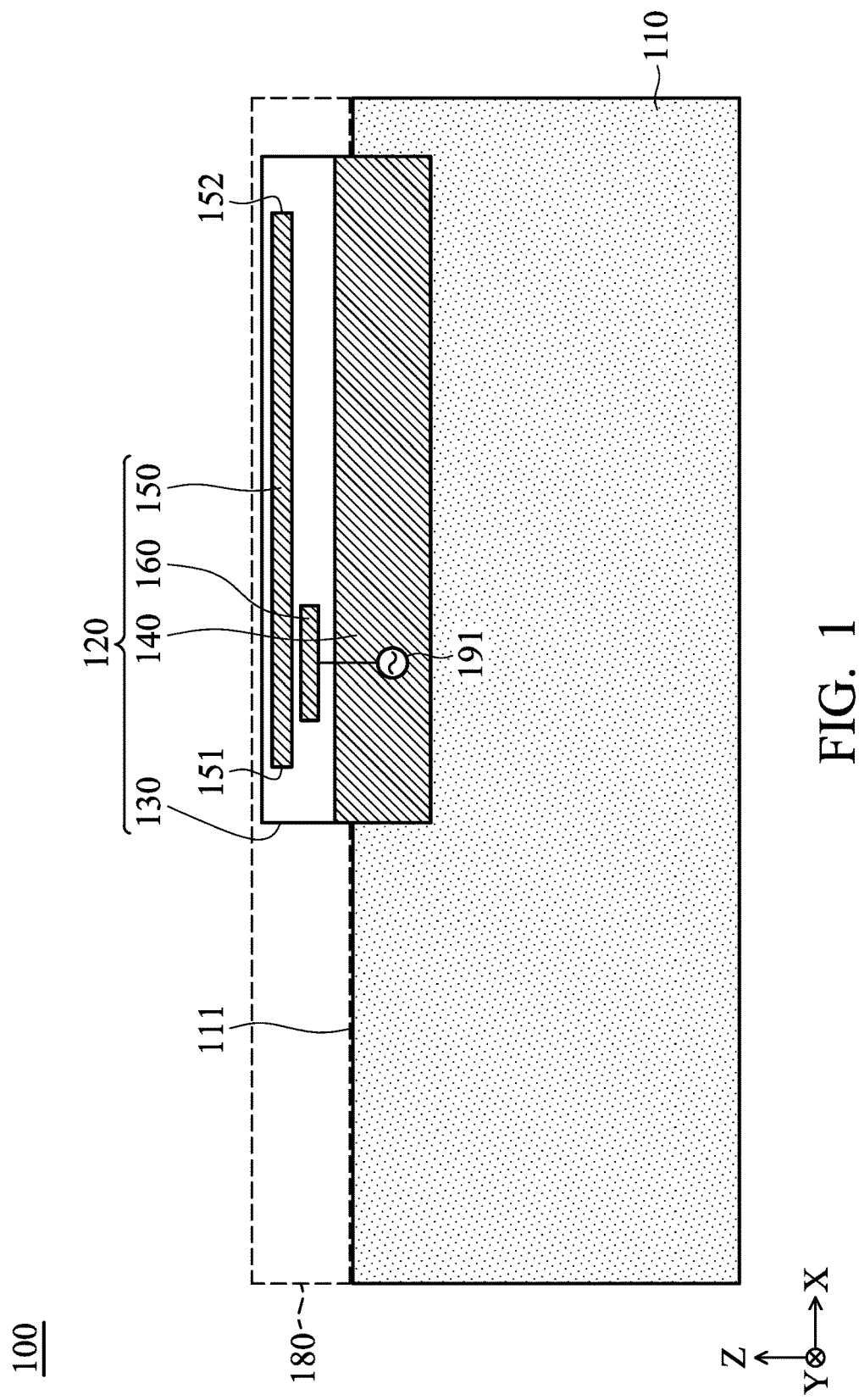
FIG. 1 is a diagram of a mobile device according to an embodiment of the invention.

FIG. 1 is a diagram of a mobile device 100 according to an embodiment of the invention. The mobile device 100 may be a smartphone, a tablet computer, or a notebook computer. As shown in FIG. 1, the mobile device 100 at least includes a system ground plane 110 and an antenna system 120. The system ground plane 110 may be a ground copper plane. In some embodiments, an antenna window 180 is designed at an edge 111 of the system ground plane 110. The antenna window 180 may be made of a nonconductive material, such that electromagnetic waves can transmit through the antenna window 180. In some embodiments, the vertical projection of the antenna system 120 may be partially or completely inside the antenna window 180. It should be understood that the mobile device 100 may further include other components, such as a touch control panel, a processor, a power supply module, and a housing, although they are not displayed in FIG. 1.

The antenna system 120 at least includes a dielectric substrate 130, an antenna ground plane 140, a radiation element 150, and a first feeding element 160. The dielectric substrate 130 may be an FR4 (Flame Retardant 4) substrate. The antenna ground plane 140, the radiation element 150, and the first feeding element 160 may be disposed on a surface of the dielectric substrate 130. The antenna ground plane 140, the radiation element 150, and the first feeding element 160 may be made of conductive materials, such as copper, silver, aluminum, iron, or their alloys. The antenna ground plane 140 may be coupled through one or more via elements to the system ground plane 110. The first feeding element 160 is coupled to a first signal source 191. The first feeding element 160 is positioned between the radiation element 150 and the antenna ground plane 140. The first feeding element 160 is completely separate from the radiation element 150. In other words, the radiation element 150 is float. The radiation element 150 is excited by the first feeding element 160 by coupling, so as to generate a low-frequency band and a high-frequency band.

Figure 2:
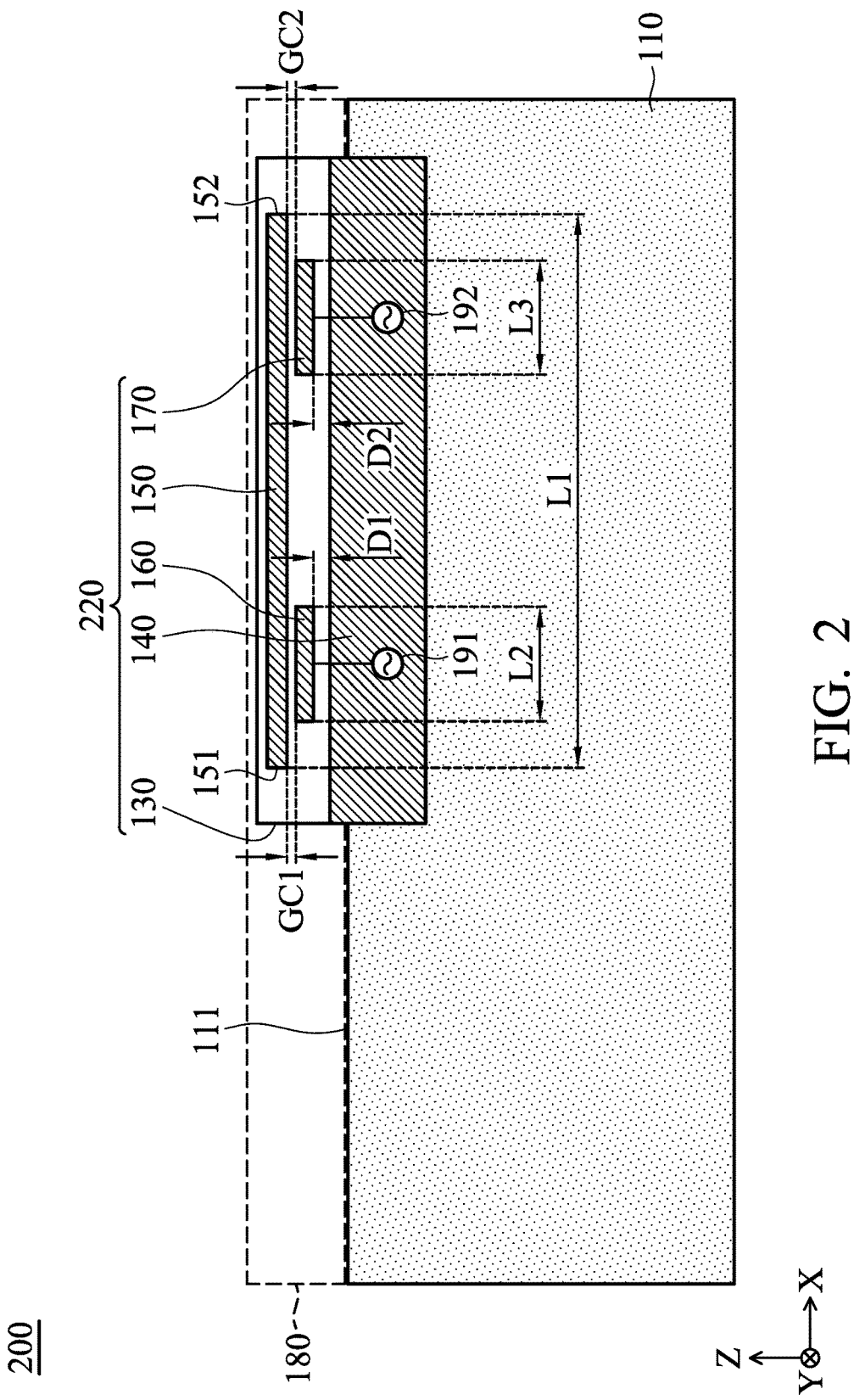
FIG. 2 is a diagram of a mobile device according to an embodiment of the invention.

FIG. 2 is a diagram of a mobile device 200 according to an embodiment of the invention. FIG. 2 is similar to FIG. 1. In the embodiment of FIG. 2, an antenna system 220 of the mobile device 200 further includes a second feeding element 170. The second feeding element 170 may be made of a conductive material, such as copper, silver, aluminum, iron, or their alloys. The second feeding element 170 is coupled to a second signal source 192. The second feeding element 170 is positioned between the radiation element 150 and the antenna ground plane 140. The second feeding element 170 is completely separate from the radiation element 150. The radiation element 150 is further excited by the second feeding element 170 by coupling, so as to generate the aforementioned low-frequency band and high-frequency band. The first feeding element 160 and the second feeding element 170 may be the same size and shape, and they may be arranged symmetrically on the surface of the dielectric substrate 130. In some embodiments, the vertical projection of the radiation element 150, the vertical projection of the first feeding element 160, and the vertical projection of the second feeding element 170 are all completely inside the antenna window 180, and therefore the radiation pattern of the antenna system 220 cannot be affected by the nearby metal components.

With respect to antenna theory, the antenna system 220 is a dual-coupled-feed antenna. A first coupling gap GC1 is formed between the radiation element 150 and the first feeding element 160. A second coupling gap GC2 is formed between the radiation element 150 and the second feeding element 170. When the antenna system 220 is excited by the first signal source 191, a first resonant path is formed from the first feeding element 160 through the first coupling gap GC1 to a first end 151 of the radiation element 150, and a second resonant path is formed from the first feeding element 160 through the first coupling gap GC1 to a second end 152 of the radiation element 150. The first resonant path is used to generate the aforementioned high-frequency band. The second resonant path is used to generate the aforementioned low-frequency band. In addition, when the antenna system 220 is excited by the second signal source 192, a third resonant path is formed from the second feeding element 170 through the second coupling gap GC2 to the second end 152 of the radiation element 150, and a fourth resonant path is formed from the second feeding element 170 through the second coupling gap GC2 to the first end 151 of the radiation element 150. The third resonant path is used to generate the aforementioned high-frequency band. The fourth resonant path is used to generate the aforementioned low-frequency band. Therefore, the antenna system 220 can cover dual-band operations of high and low frequency, without using any coupling grounding mechanism.

In some embodiments, the element sizes of the mobile device 200 are as follows. The dielectric substrate 130 has a length of about 40 mm, and a width of about 9 mm. The radiation element 150 has a straight-line shape, and its length L1 is about 0.5 wavelength (λ/2) of the aforementioned low-frequency band. The first feeding element 160 has a straight-line shape, and its length L2 is about 0.25 wavelength (λ/4) of the aforementioned high-frequency band. The second feeding element 170 has a straight-line shape, and its length L3 is about 0.25 wavelength (λ/4) of the aforementioned high-frequency band. The width of the first coupling gap GC1 is approximately from 0.15 mm to 0.35 mm. The width of the second coupling gap GC2 is approximately from 0.15 mm to 0.35 mm. The distance D1 between the first feeding element 160 and the antenna ground plane 140 is approximately from 0.45 mm to 0.65 mm. The distance D2 between the second feeding element 170 and the antenna ground plane 140 is approximately from 0.45 mm to 0.65 mm. The above ranges of element sizes are obtained according to experimental results repeated many times, and they can optimize the mutual coupling and the impedance matching of the antenna system 220.

Figure 3:
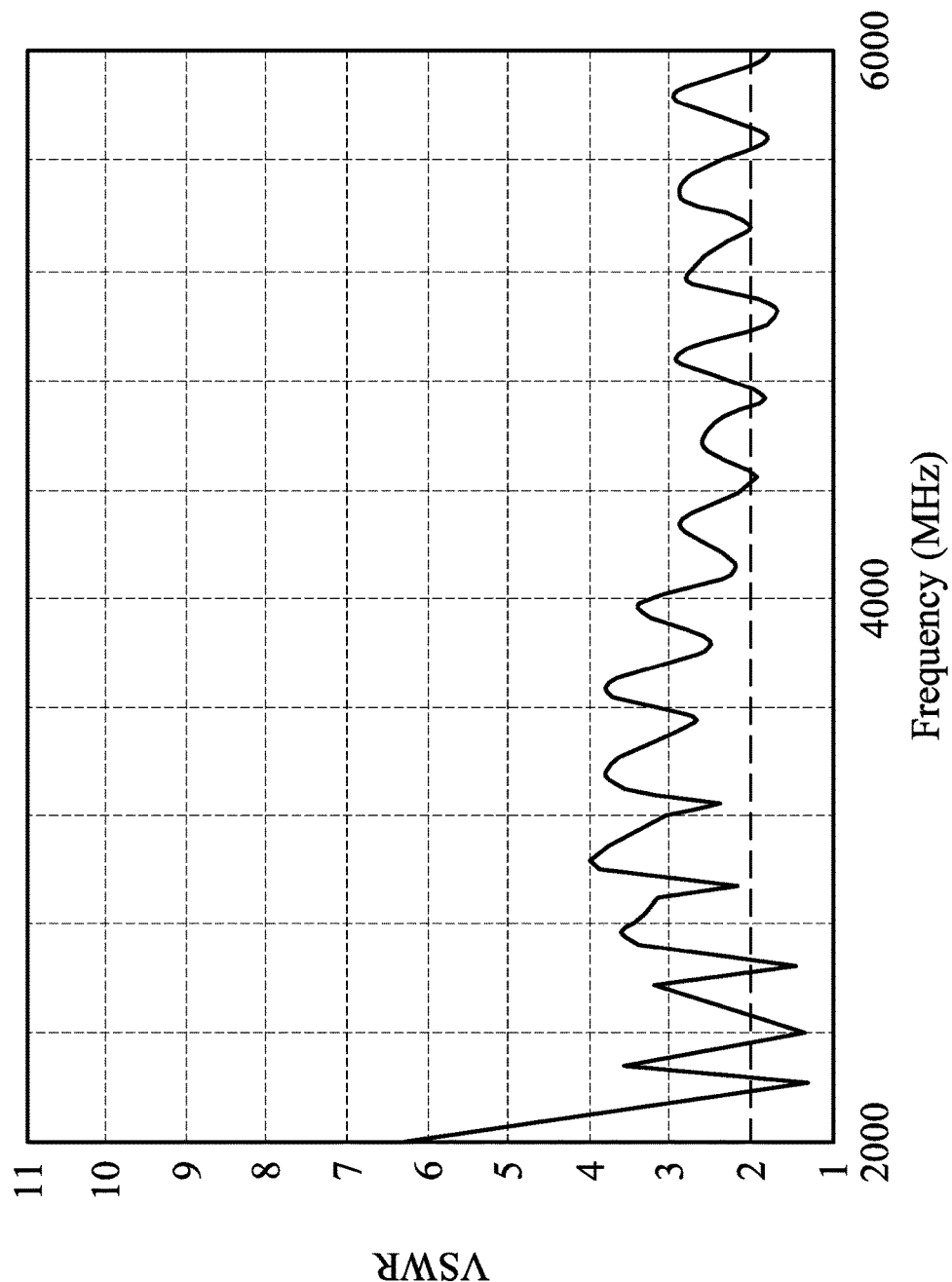
FIG. 3 is a diagram of VSWR (Voltage Standing Wave Ratio) of an antenna system of a mobile device according to an embodiment of the invention.

FIG. 3 is a diagram of VSWR (Voltage Standing Wave Ratio) of the antenna system 220 of the mobile device 200 according to an embodiment of the invention. The horizontal axis represents the operation frequency (MHz), and the vertical axis represents the VSWR. In the embodiment of FIG. 3, when the antenna system 220 is excited by the first signal source 191, the first feeding element 160 resonates with the radiation element 150, so as to generate a low-frequency band from about 2400 MHz to about 2500 MHz, and a high-frequency band from about 5150 MHz to about 5850 MHz.

Figure 4:
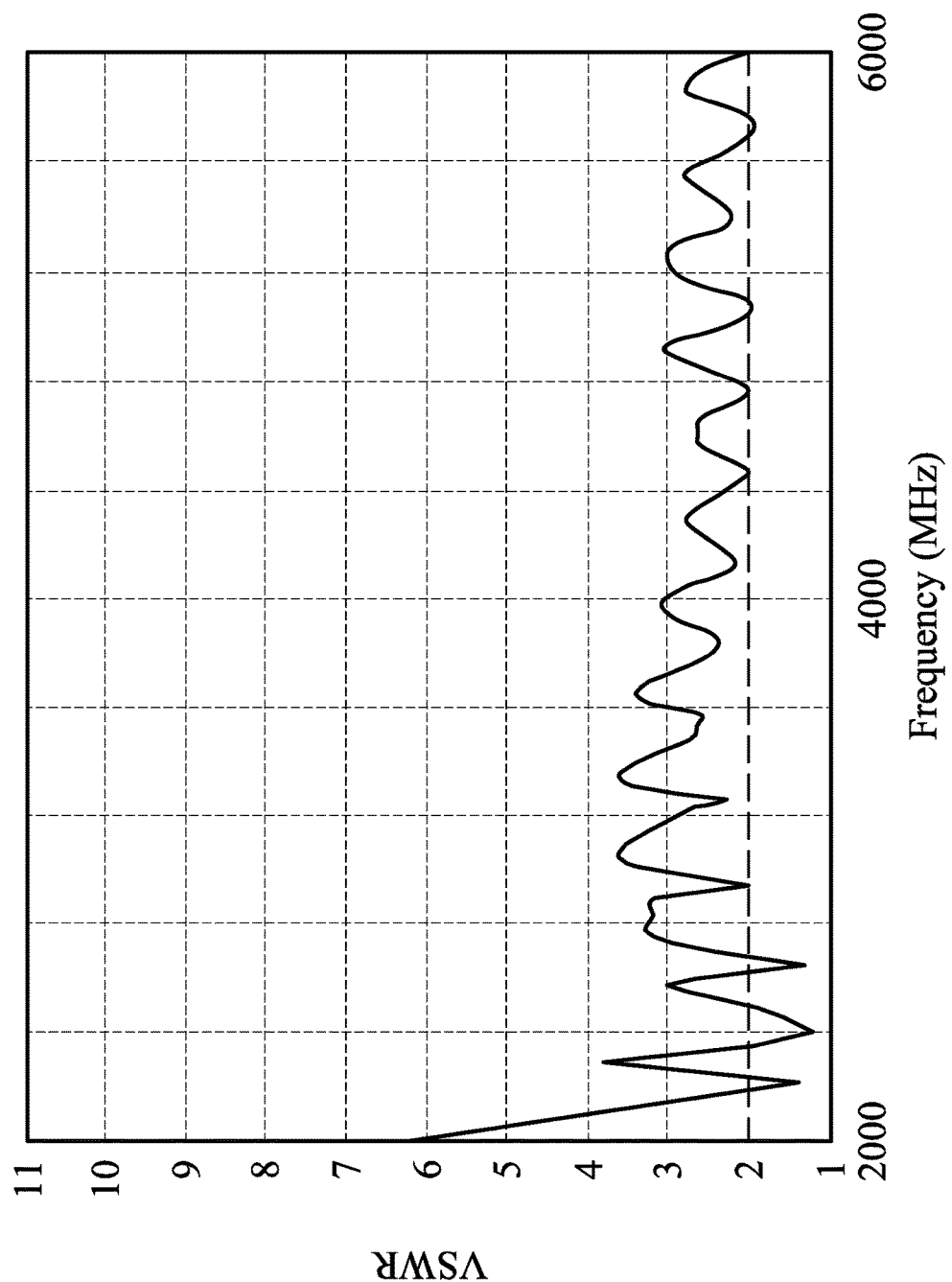
FIG. 4 is a diagram of VSWR of an antenna system of a mobile device according to an embodiment of the invention.

FIG. 4 is a diagram of VSWR of the antenna system 220 of the mobile device 200 according to an embodiment of the invention. The horizontal axis represents the operation frequency (MHz), and the vertical axis represents the VSWR. In the embodiment of FIG. 4, when the antenna system 220 is excited by the second signal source 192, the second feeding element 170 resonates with the radiation element 150, so as to generate a low-frequency band from about 2400 MHz to about 2500 MHz, and a high-frequency band from about 5150 MHz to about 5850 MHz.

Figure 5:
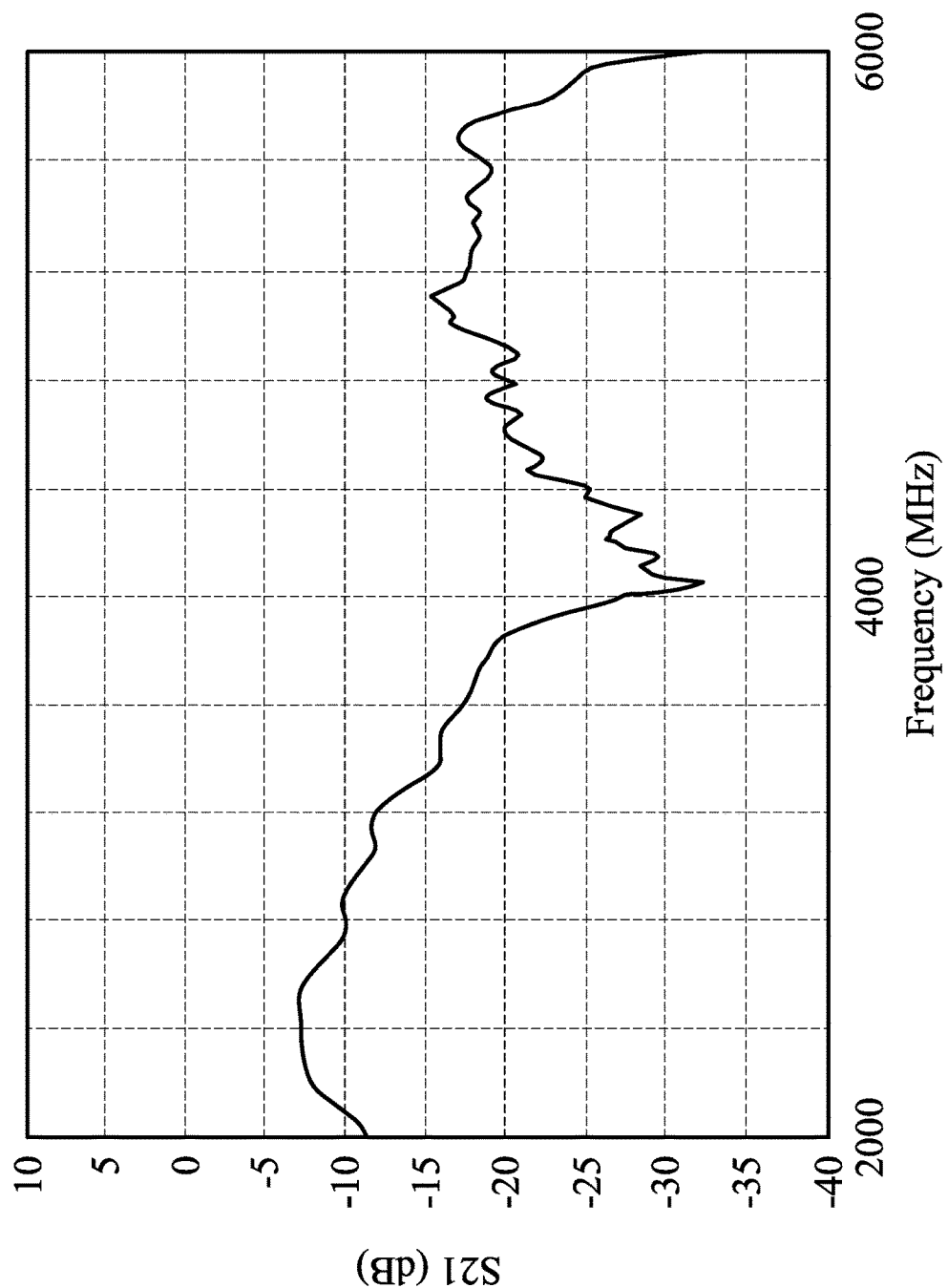
FIG. 5 is a diagram of S-parameter of an antenna system of a mobile device according to an embodiment of the invention.

FIG. 5 is a diagram of S-parameter of the antenna system 220 of the mobile device 200 according to an embodiment of the invention. The horizontal axis represents the operation frequency (MHz), and the vertical axis represents the S21 (or S12) parameter. In the embodiment of FIG. 5, the first signal source 191 is set to a first port (Port 1), and the second signal source 192 is set to a second port (Port 2). As shown in FIG. 5, over the aforementioned low-frequency band and high-frequency band, the S21 (or S12) parameter between the first port and the second port is below −7 dB, and it means that the isolation between antennas of the antenna system 220 is acceptable.

According to the measurement results of FIG. 3, FIG. 4, and FIG. 5, the antenna system 220 is considered as a 2×2 MIMO (Multi-Input and Multi-Output) antenna assembly, and it can increase the antenna diversity gain of the mobile device 200. Specifically, the first feeding element 160 and the radiation element 150 form a first coupling antenna element of the MIMO antenna assembly, and the second feeding element 170 and the radiation element 150 form a second coupling antenna element of the MIMO antenna assembly. Furthermore, because the antenna system 220 has sufficient isolation between antennas, the invention can significantly reduce the total size of the antenna system 220 by disposing the two coupling antenna elements on the same dielectric substrate 130 using the MIMO arrangement.

Figure 6:
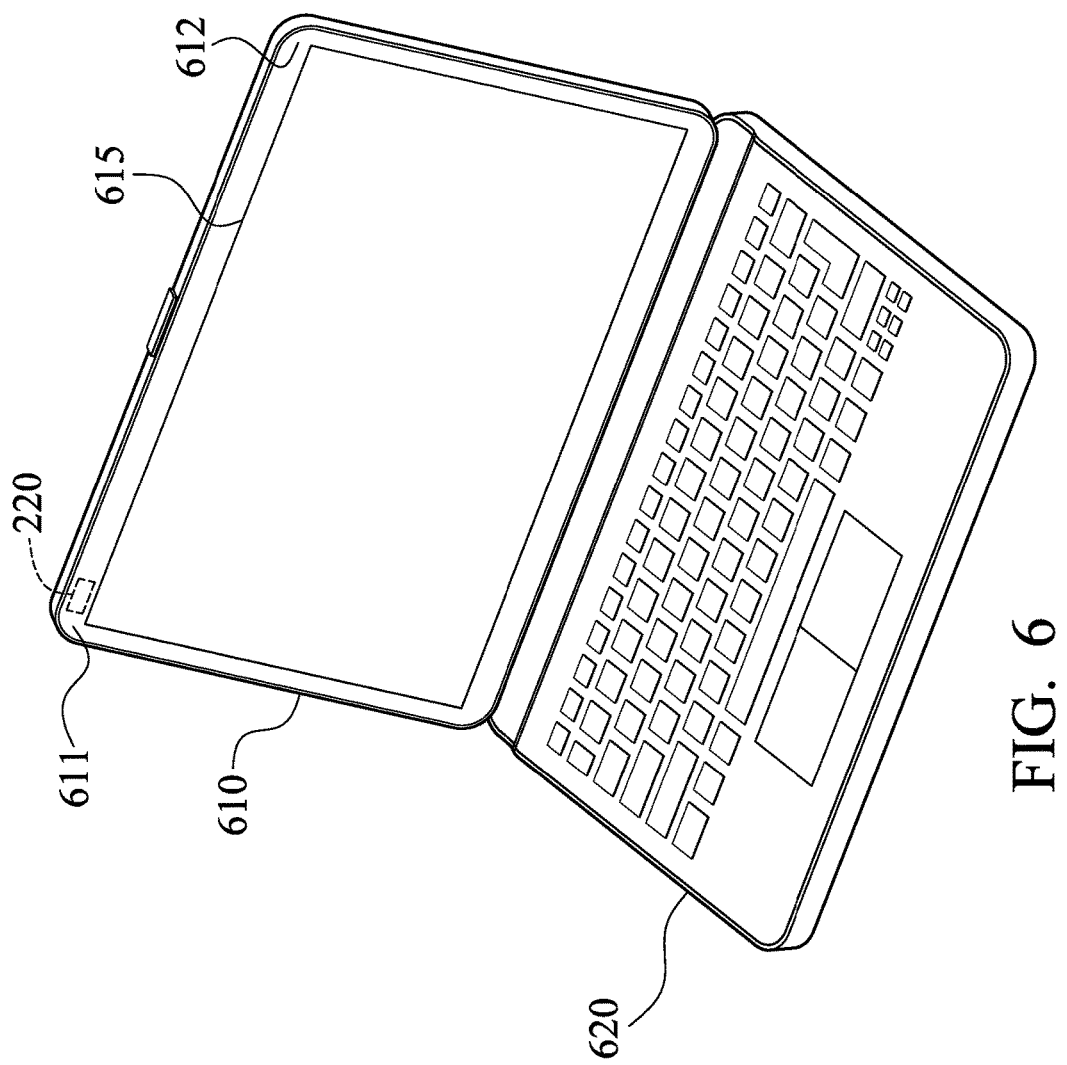
FIG. 6 is a diagram of a mobile device according to an embodiment of the invention.

FIG. 6 is a diagram of a mobile device 600 according to an embodiment of the invention. In the embodiment of FIG. 6, the mobile device 600 is a notebook computer, which includes an upper cover 610 and a lower cover 620. A display device 615 is embedded in the upper cover 610. The aforementioned antenna system 220 is disposed between the display device 615 and an edge of the upper cover 610. It should be noted that the conventional MIMO antenna system usually disposes two independent antennas at two opposite corners 611 and 612 of the upper cover 610, respectively, and the spacing between antennas can be 200 mm or longer. As a result, the conventional MIMO antenna system occupies a relatively large clearance region. In comparison to the conventional design, the antenna system 220 of the invention is disposed on a single dielectric substrate 130, and is adjacent to only one corner 611 or 612 of the upper cover 610, such that the total size of the antenna system 220 can be significantly reduced. Accordingly, the invention is suitable for application in a variety of small mobile communication devices.

Figure 7A:
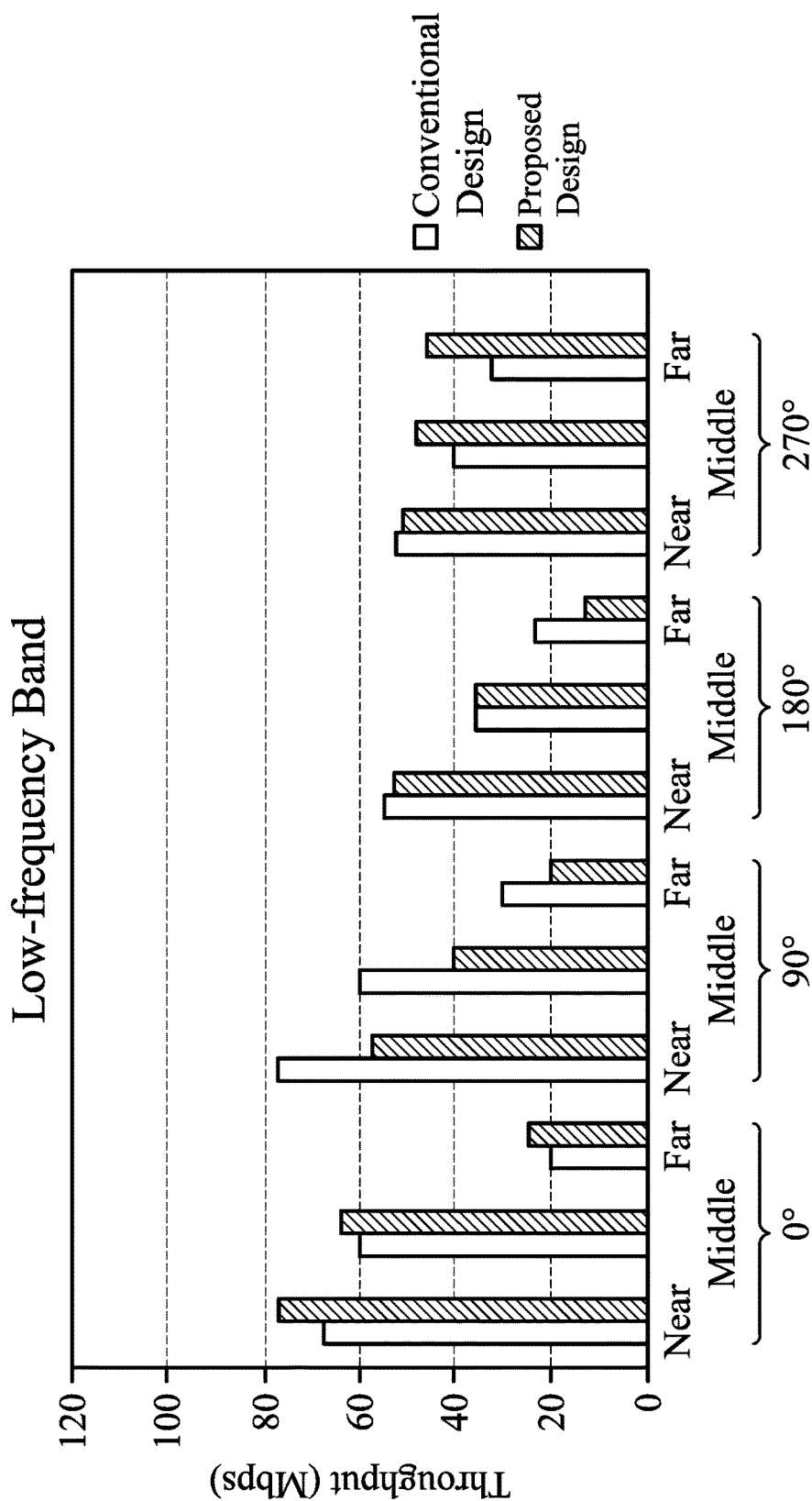
FIG. 7A is a diagram of throughput of an antenna system of a mobile device in a low-frequency band according to an embodiment of the invention.
Figure 7B:
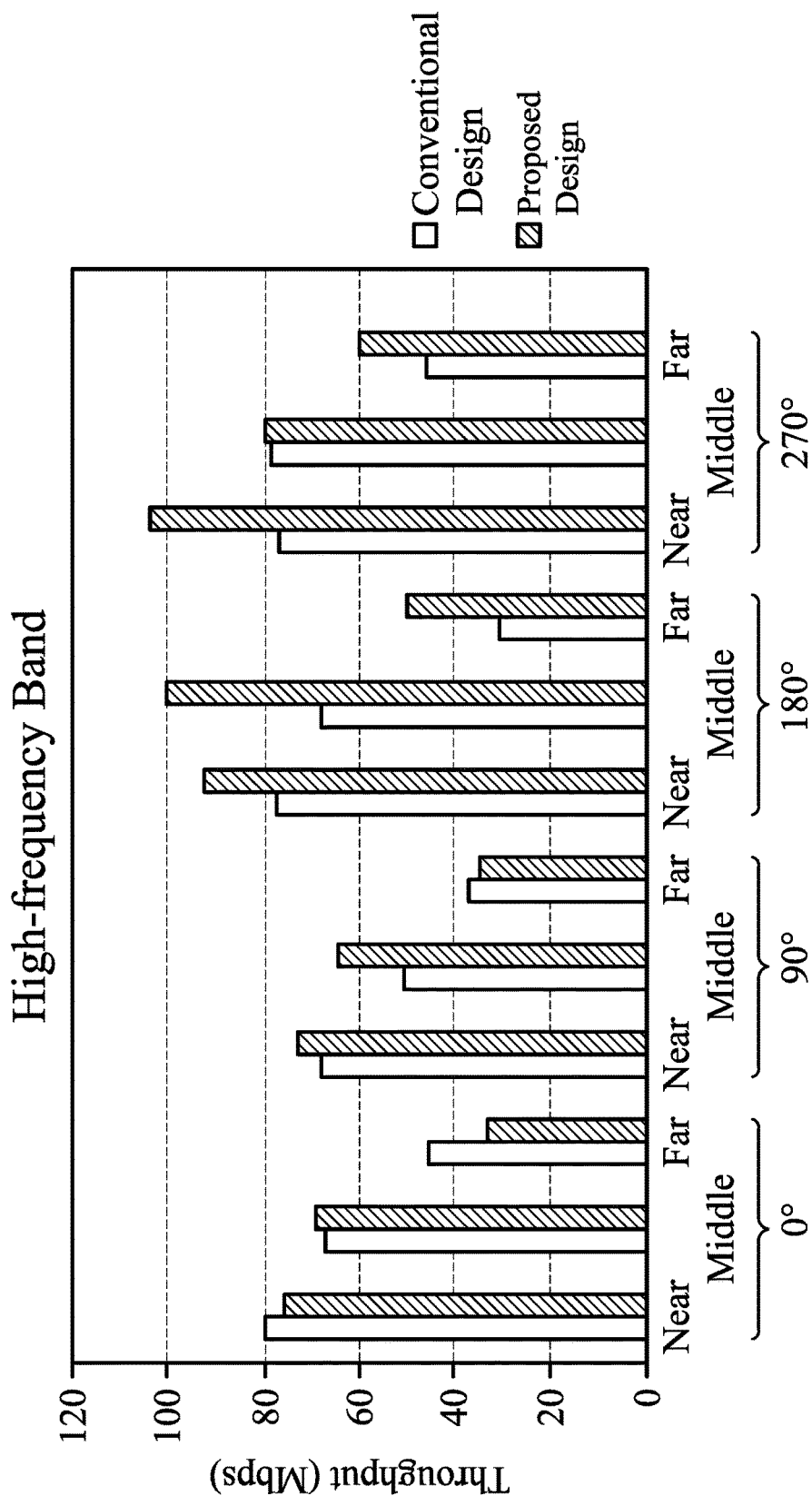
FIG. 7B is a diagram of throughput of an antenna system of a mobile device in a high-frequency band according to an embodiment of the invention.

FIG. 7A is a diagram of throughput of the antenna system 220 of the mobile device 600 in the low-frequency band according to an embodiment of the invention. FIG. 7B is a diagram of throughput of the antenna system 220 of the mobile device 600 in the high-frequency band according to an embodiment of the invention. Please refer to FIG. 2, FIG. 6, FIG. 7A, and FIG. 7B together. In the embodiment of FIG. 7A and FIG. 7B, the throughput of the antenna system 220 is measured at different angles, such as the 0-degree angle (the direction of the −Y axis), the 90-degree angle (the direction of the +X axis), the 180-degree angle (the direction of the +Y axis), and the 270-degree angle (the direction of the −X axis), and further measured from different distances, such as a short distance (Near), a median distance (Middle), and a long distance (Far). In comparison to the conventional design which includes two independent antennas, the antenna system 220 of the invention can provide almost equal or even better throughput, and therefore, the proposed design has the advantages of both minimizing the antenna size and increasing the throughput. On the other hand, according to practical measurements, the antenna efficiency of the proposed antenna system 220 is about −2 dB in the low-frequency band and about −4 dB in the high-frequency band, and the maximum radiation gain of the proposed antenna system 220 is about 3 dBi. The above measurement result can meet the criterion of practical application of general mobile communication.

Figure 8:
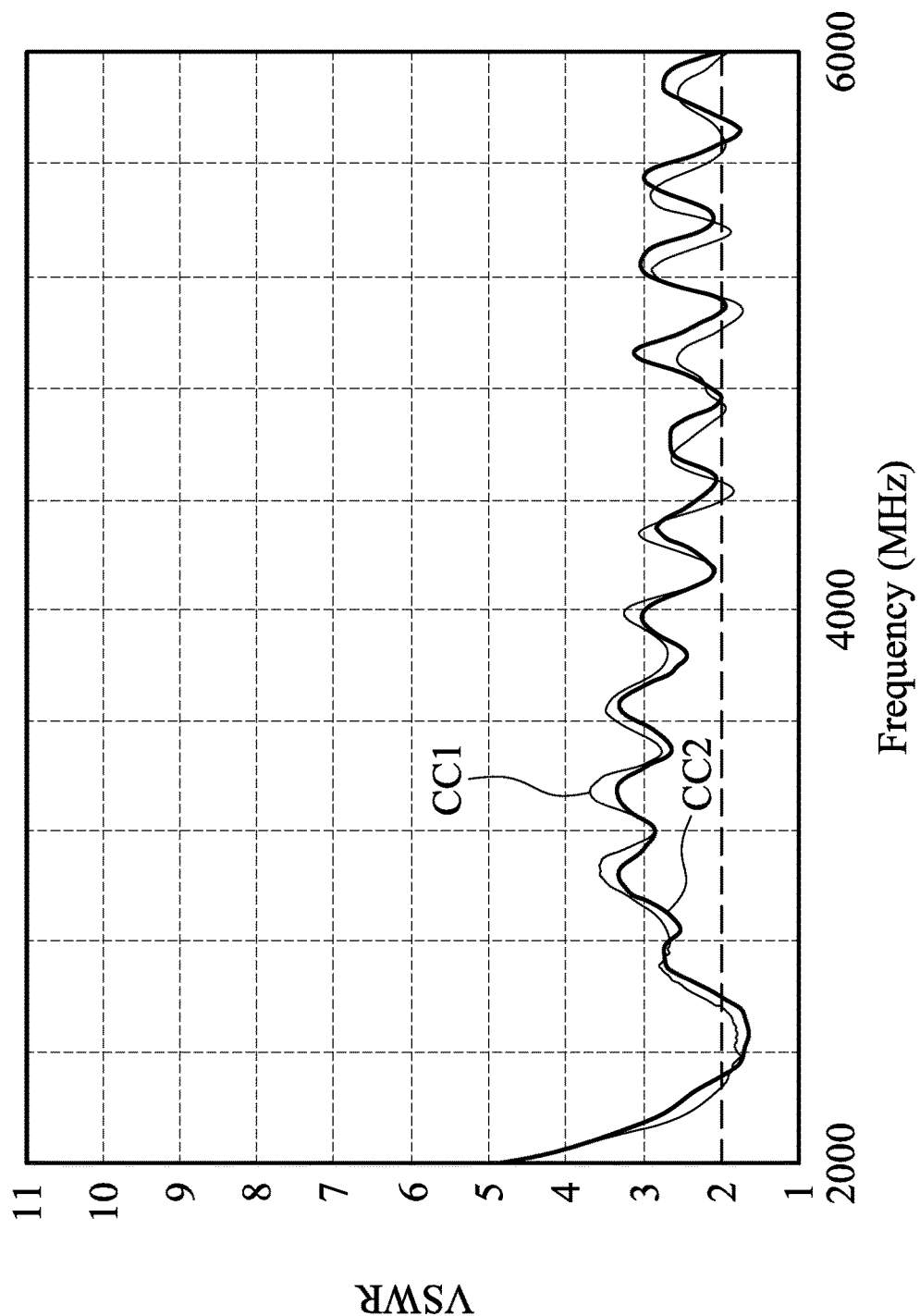
FIG. 8 is a diagram of VSWR of an antenna system of a mobile device according to an embodiment of the invention.

FIG. 8 is a diagram of VSWR of the antenna system 220 of the mobile device 200 according to an embodiment of the invention. The horizontal axis represents the operation frequency (MHz), and the vertical axis represents the VSWR. In the embodiment of FIG. 8, when the antenna system 220 is excited by both the first signal source 191 and the second signal source 192, the first feeding element 160 resonates with the radiation element 150 (its operation frequency band is shown as a first curve CC1), and the second feeding element 170 resonates with the radiation element 150 (its operation frequency band is shown as a second curve CC2), so as to generate a low-frequency band from about 2400 MHz to about 2500 MHz, and a high-frequency band from about 5150 MHz to about 5850 MHz. In comparison to the measurement result of FIG. 3 and FIG. 4, the difference between these embodiments is very small. In other words, even if the antenna system 220 is excited by the first signal source 191 and the second signal source 192 at the same time, it does not negatively affect the original resonant frequency and operation that are characteristic of each antenna element of the antenna system 220.

Figure 9A:
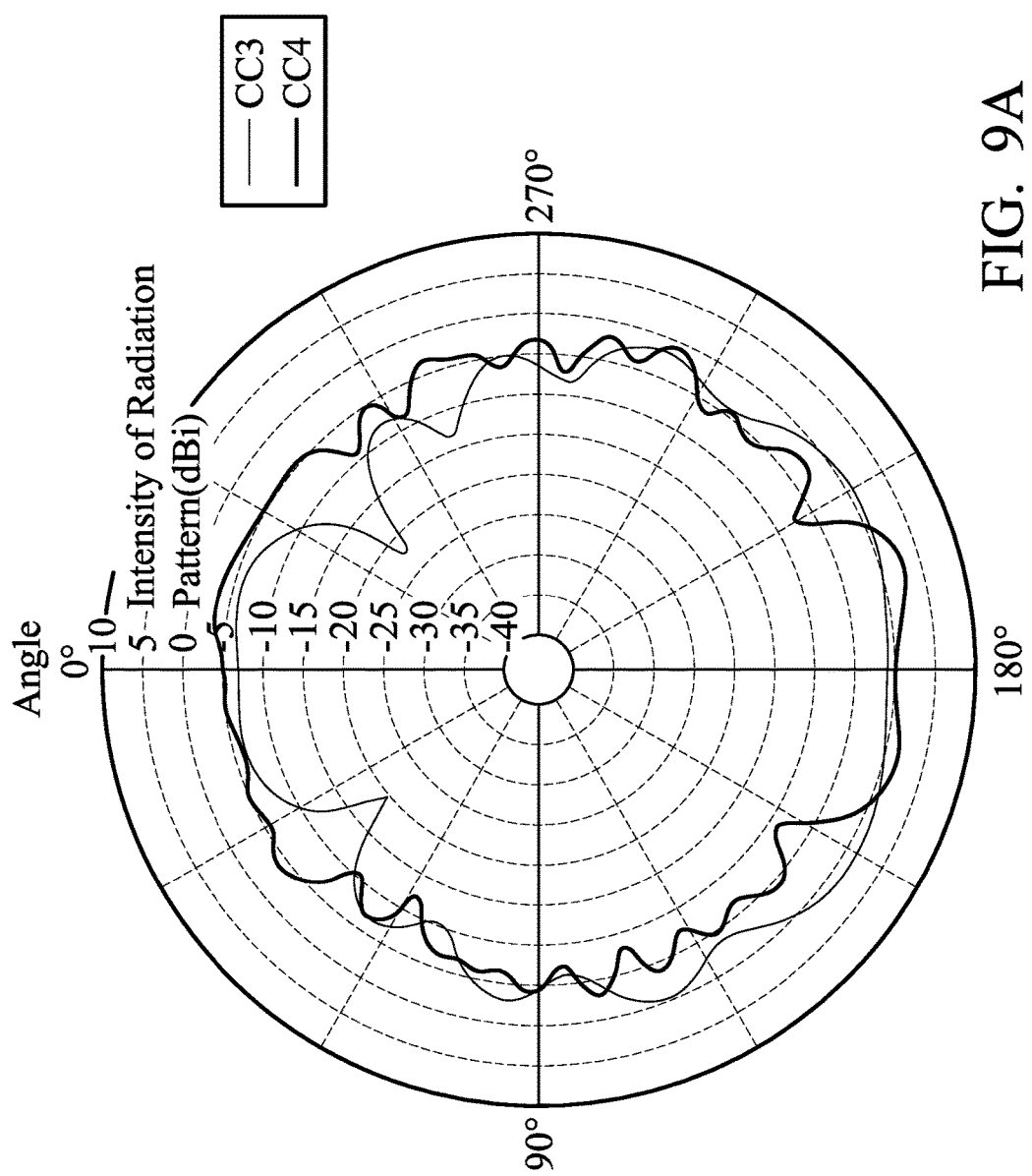
FIG. 9A is a radiation pattern of an antenna system of a mobile device according to an embodiment of the invention.

FIG. 9A is a radiation pattern of the antenna system 220 of the mobile device 200 according to an embodiment of the invention. In the embodiment of FIG. 9A, the antenna system 220 is excited by the first signal source 191. A third curve CC3 represents the radiation pattern of the antenna system 220 operating in the low-frequency band. A fourth curve CC4 represents the radiation pattern of the antenna system 220 operating in the high-frequency band. According to the measurement result of FIG. 9A, for both the high and low frequency bands, when the antenna system 220 is excited by the first signal source 191, the main beam of the antenna system 220 is toward the 180-degree angle (the direction of the +Y axis), and its maximum antenna gain is about 3 dBi.

Figure 9B:
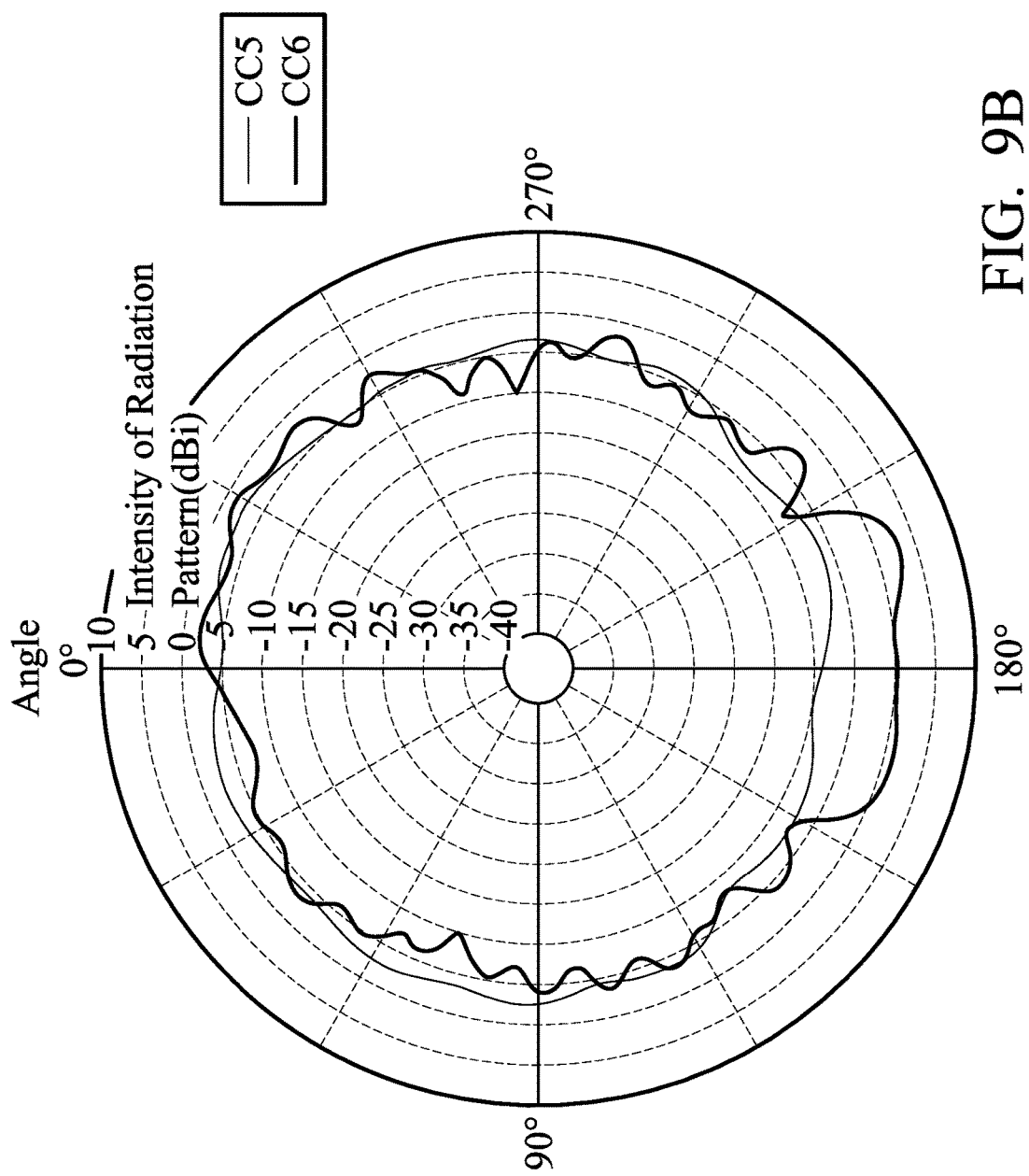
FIG. 9B is a radiation pattern of an antenna system of a mobile device according to an embodiment of the invention.

FIG. 9B is a radiation pattern of the antenna system 220 of the mobile device 200 according to an embodiment of the invention. In the embodiment of FIG. 9B, the antenna system 220 is excited by the second signal source 192. A fifth curve CC5 represents the radiation pattern of the antenna system 220 operating in the low-frequency band. A sixth curve CC6 represents the radiation pattern of the antenna system 220 operating in the high-frequency band. According to the measurement result of FIG. 9B, for both the high and low frequency bands, when the antenna system 220 is excited by the second signal source 192, the main beam of the antenna system 220 is toward the 180-degree angle (the direction of the +Y axis), and its maximum antenna gain is about 3 dBi.

Note that the above element sizes, element shapes, and frequency ranges are not limitations of the invention. An antenna designer can fine-tune these settings or values according to different requirements. It should be understood that the mobile device and the antenna system of the invention are not limited to the configurations of FIGS. 1-9. The invention may include any one or more features of any one or more embodiments of FIGS. 1-9. In other words, not all of the features displayed in the figures should be implemented in the mobile device and the antenna system of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A mobile device, comprising:
    a system ground plane; and
    an antenna system, comprising;
    a dielectric substrate;
    an antenna ground plane, coupled to the system ground plane;
    a radiation element;
    a first feeding element, coupled to a first signal source, and positioned between the radiation element and the antenna ground plane, wherein the first feeding element is completely separate from the radiation element; and
    a second feeding element, coupled to a second signal source, and positioned between the radiation element and the antenna ground plane, wherein the second feeding element is completely separate from the radiation element.

2. The mobile device as claimed in claim 1, wherein the radiation element is excited by the first feeding element by coupling, so as to generate a low-frequency band and a high-frequency band.

3. The mobile device as claimed in claim 2, wherein the low-frequency band is from 2400 MHz to 2500 MHz, and the high-frequency band is from 5150 MHz to 5850 MHz.

4. The mobile device as claimed in claim 2, wherein a length of the radiation element is 0.5 wavelength of the low-frequency band.

5. The mobile device as claimed in claim 2, wherein a length of the first feeding element is 0.25 wavelength of the high-frequency band.

6. The mobile device as claimed in claim 1, wherein a first coupling gap is formed between the radiation element and the first feeding element, and a width of the first coupling gap is from 0.15 mm to 0.35 mm.

7. The mobile device as claimed in claim 1, wherein the radiation element is further excited by the second feeding element by coupling, so as to generate a low-frequency band and a high-frequency band, and wherein a length of the second feeding element is 0.25 wavelength of the high-frequency band.

8. The mobile device as claimed in claim 1, wherein a second coupling gap is formed between the radiation element and the second feeding element, and a width of the second coupling gap is from 0.15 mm to 0.35 mm.

9. The mobile device as claimed in claim 1, wherein the mobile device is a notebook computer, the notebook computer further comprises an upper cover and a lower cover, a display device is embedded in the upper cover, and the antenna system is disposed between the display device and an edge of the upper cover and is adjacent to a corner of the upper cover.

* * * * *